US012586195B2

(12) United States Patent
Nakazawa et al.

(10) Patent No.: US 12,586,195 B2
(45) Date of Patent: Mar. 24, 2026

(54) OPHTHALMIC INFORMATION PROCESSING APPARATUS, OPHTHALMIC APPARATUS, OPHTHALMIC INFORMATION PROCESSING METHOD, AND RECORDING MEDIUM

(71) Applicants: Topcon Corporation, Tokyo (JP); TOHOKU UNIVERSITY, Sendai (JP); RIKEN, Saitama (JP)

(72) Inventors: Toru Nakazawa, Sendai (JP); Kazuko Omodaka, Sendai (JP); Hideo Yokota, Wako (JP); Guangzhou An, Tokyo (JP); Takuma Udagawa, Tokyo (JP)

(73) Assignees: TOPCON CORPORATION, Tokyo (JP); TOHOKU UNIVERSITY, Sendai (JP); RIKEN, Wako (JP)

( * ) Notice: Subject to any disclaimer, the term of this patent is extended or adjusted under 35 U.S.C. 154(b) by 342 days.

(21) Appl. No.: 18/142,049

(22) Filed: May 2, 2023

(65) Prior Publication Data

US 2023/0267610 A1     Aug. 24, 2023

Related U.S. Application Data

(63) Continuation of application No. PCT/JP2021/040329, filed on Nov. 2, 2021.

(30) Foreign Application Priority Data

Nov. 4, 2020    (JP) ................................. 2020-184087

(51) Int. Cl.
*G06K 9/00*        (2022.01)
*G06T 7/00*        (2017.01)
(52) U.S. Cl.
CPC .. *G06T 7/0014* (2013.01); *G06T 2207/10101* (2013.01); *G06T 2207/20081* (2013.01); *G06T 2207/30041* (2013.01)

(58) Field of Classification Search
CPC ......... G06T 7/0014; G06T 2207/10101; G06T 2207/20081; G06T 2207/30041;
(Continued)

(56) References Cited

U.S. PATENT DOCUMENTS

| | | | | | |
|---|---|---|---|---|---|
| 10,468,142 | B1 * | 11/2019 | Abou Shousha | ...... | G16H 30/20 |
| 11,080,850 | B2 * | 8/2021 | Cho | ........................ | A61B 3/145 |

(Continued)

FOREIGN PATENT DOCUMENTS

| | | |
|---|---|---|
| JP | 2019-005319 A | 1/2019 |
| JP | 2020-036835 A | 3/2020 |

(Continued)

OTHER PUBLICATIONS

International Search Report and Written Opinion mailed on Jan. 25, 2022, received for PCT Application PCT/JP2021/040329, filed on Nov. 2, 2021, 12 pages including English Translation.

(Continued)

*Primary Examiner* — Atiba O Fitzpatrick
(74) *Attorney, Agent, or Firm* — XSENSUS LLP

(57) ABSTRACT

An ophthalmic information processing apparatus includes an acquisition unit and a disease estimation unit. The acquisition unit is configured to acquire a plurality of images with different cross-sectional orientations from each other of a subject's eye. The disease estimation unit is configured to output estimation information for estimating whether or not the subject's eye is a glaucoma eye from the images, using a plurality of learned models obtained by performing machine learning for each type of the images.

8 Claims, 9 Drawing Sheets

(58) Field of Classification Search
CPC . G06T 2207/10016; G06T 2207/20056; G06T 2207/20084; G06T 7/0012; A61B 3/0025; A61B 5/0066; A61B 3/102; G06N 20/20; G06N 3/0454; G06V 10/87
See application file for complete search history.

(56) References Cited

U.S. PATENT DOCUMENTS

| | | | |
|---|---|---|---|
| 2018/0368679 A1 | 12/2018 | An et al. | |
| 2019/0206054 A1* | 7/2019 | Mao | G06V 10/82 |
| 2019/0220973 A1* | 7/2019 | Cho | G06T 7/136 |
| 2019/0313895 A1* | 10/2019 | Hayashi | G06F 18/285 |
| 2020/0035362 A1 | 1/2020 | Abou Shousha et al. | |
| 2020/0065967 A1 | 2/2020 | Sugaya et al. | |
| 2020/0074622 A1* | 3/2020 | Yang | A61B 3/102 |
| 2021/0057103 A1* | 2/2021 | Abou Shousha | G06N 3/045 |
| 2022/0151483 A1 | 5/2022 | Ono et al. | |
| 2022/0400943 A1* | 12/2022 | Lee | A61B 3/102 |

FOREIGN PATENT DOCUMENTS

| | | |
|---|---|---|
| JP | 2020-058615 A | 4/2020 |
| JP | 2021097989 A | 7/2021 |
| JP | 2021-145805 A | 9/2021 |
| WO | 2018/211688 A1 | 11/2018 |
| WO | 2020/023959 A1 | 1/2020 |
| WO | 2021/029231 A1 | 2/2021 |

OTHER PUBLICATIONS

An et al., "Glaucoma Diagnosis with Machine Learning Based on Optical Coherence Tomography and Color Fundus Images", Hindawi, Journal of Healthcare Engineering, vol. 2019, Article ID 4061313, 9 pages.

Ran et al., "Deep learning in glaucoma with optical coherence tomography: a review", The Royal College of Ophthalmologists, Eye, vol. 35, 2021, pp. 188-201.

Alluwimi Muhammed s. et al: "Identifying Glaucomatous Damage to the Macula", Optometry and Vision Science., [Online] vol. 95, No. 2, Feb. 2018 (Feb. 2018), pp. 96-105, XP093127871.

Mehta Parmita et al: "Automated detection of glaucoma with interpretable machine learning using clinical data and multi-modal retinal images", bioRxiv, Feb. 27, 2020 (Feb. 27, 2020), XP093135981, 20pp.

Extended European Search Report issued Sep. 12, 2024, in corresponding European Patent Application No. 21889173.7, 11pp.

Automated Detection of Glaucoma With Interpretable Machine Learning Using Clinical Data and Multimodal Retinal Images, bioRxiv, Cold Spring Harbar Laboratory, stored on Mar. 6, 2003, Web Archive as of Mar. 6, 2020, <URL: https://web.archive.org/web/20200306173423/https://www.biorxiv.org/content/10.1101/2020.02.26.967208v1>, 4pp.

Japanese Office Action issued Sep. 9, 2025, in corresponding Japanese Patent Application No. 2022-560774, 9pp.

* cited by examiner

100

110

CONTROLLER

MAIN CONTROLLER — 111

STORAGE UNIT — 112

130

DATA PROCESSOR

ANALYZER — 200

ESTIMATION MODEL BUILDING UNIT — 210

ESTIMATION UNIT — 220

COMMUNICATION UNIT — 140

200

ANALYZER

IMAGE GENERATOR — 201

FIG. 8

OPHTHALMIC INFORMATION PROCESSING APPARATUS, OPHTHALMIC APPARATUS, OPHTHALMIC INFORMATION PROCESSING METHOD, AND RECORDING MEDIUM

CROSS-REFERENCE TO RELATED APPLICATIONS

The present application is a continuation application of International Patent Application No. PCT/JP2021/040329, filed Nov. 2, 2021, which claims priority to Japanese Patent Application No. 2020-184087, filed Nov. 4, 2020, both of which are herein incorporated by reference in their entirety.

FIELD

The disclosure relates to an ophthalmic information processing apparatus, an ophthalmic apparatus, an ophthalmic information processing method, and a recording medium.

BACKGROUND

In recent years, machine learning methods represented by deep learning, have been advancing rapidly, and the practical applications of artificial intelligence technologies have been progressing in various fields. Particularly in the medical field, deep learning has improved the accuracy of detecting appearances, etc. of disease sites or tissues in diagnostic images, and accurate and highly precise medical diagnoses can be promptly performed.

For example, International Publication WO2018/211688 discloses a method for performing machine learning using characteristic points in a time-series plurality of fundus images in the past as teaching data, and diagnosing glaucoma from a time-series plurality of fundus images newly acquired using the obtained learned model. For example, Japanese Unexamined Patent Publication No. 2019-5319 discloses a method for classifying the pathologies of glaucoma in accordance with the shape of the optic disc using a neural network.

SUMMARY

One aspect of embodiments is an ophthalmic information processing apparatus, including: an acquisition unit configured to acquire a plurality of images with different cross-sectional orientations from each other of a subject's eye; and a disease estimation unit configured to output estimation information for estimating whether or not the subject's eye is a glaucoma eye from the images, using a plurality of learned models obtained by performing machine learning for each type of the images.

Another aspect of the embodiments is an ophthalmic apparatus, including: an OCT unit configured to perform optical coherence tomography on the subject's eye; an image generator configured to generate at least one of the images based on the three-dimensional OCT data acquired by the OCT unit; and the ophthalmic information processing apparatus of any one of the first aspect to the eighth aspect.

Still another aspect of the embodiments is an ophthalmic information processing method, including: an acquisition step of acquiring a plurality of images with different cross-sectional orientations from each other of a subject's eye; and a disease estimation step of outputting estimation information for estimating whether or not the subject's eye is a glaucoma eye from the images, using a plurality of learned models obtained by performing machine learning for each type of the images.

Still another aspect of the embodiments is a computer readable non-transitory recording medium in which a program of causing a computer to execute each step of the ophthalmic information processing method described above is recorded.

BRIEF DESCRIPTION OF THE DRAWINGS

FIG. 8 is a schematic diagram illustrating an example of the configuration of the ophthalmic information processing apparatus according to the embodiments.

DETAILED DESCRIPTION

Figure 1:
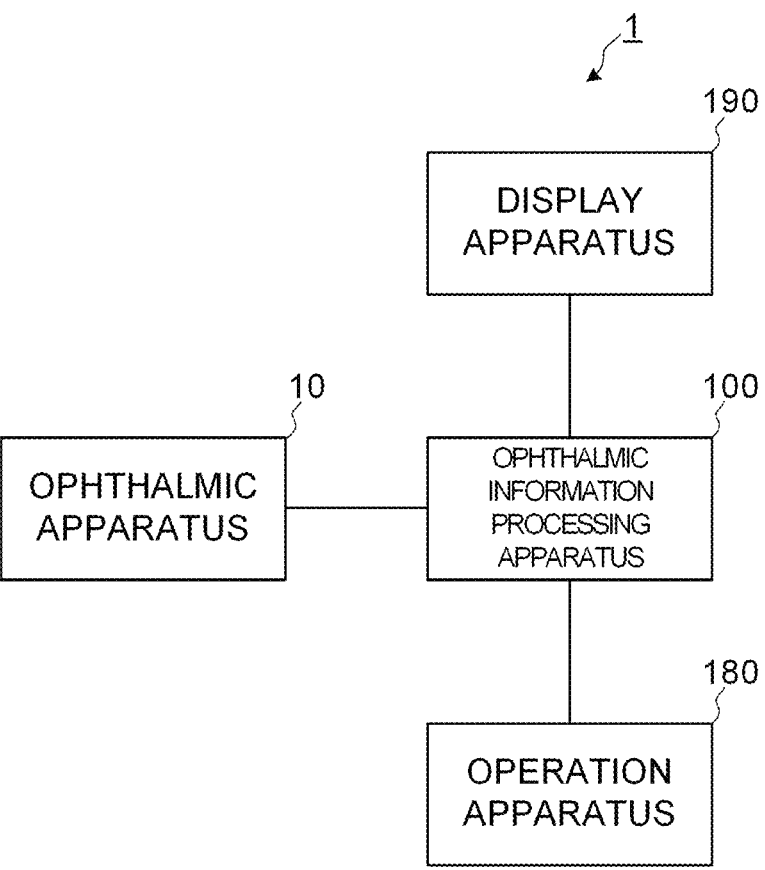
FIG. 1 is a schematic diagram illustrating an example of a configuration of an ophthalmic system according to embodiments.

Glaucoma is a disease whose symptoms will progress without appropriate treatment. If glaucoma can be detected at an early stage through screening and other means, the progression of glaucoma can be inhibited by providing appropriate treatment. Therefore, early detection of glaucoma with high precision and high accuracy is required.

According to some embodiments of the present invention, a new technique for early detecting glaucoma with high precision and high accuracy through the screening and other means can be provided.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Referring now to the drawings, exemplary some embodiments of an ophthalmic information processing apparatus, an ophthalmic apparatus, an ophthalmic information processing method, and a recording medium according to some embodiments of the present invention are described below. Any of the contents of the documents cited in the present specification and arbitrary known techniques may be applied to the embodiments below.

An ophthalmic information processing apparatus according to embodiments can perform predetermined analysis processing and predetermined display processing on three-dimensional OCT data of a subject's eye acquired using optical coherence tomography (OCT) by an ophthalmic apparatus. The ophthalmic apparatus according to some embodiments has not only a function of an OCT apparatus for performing OCT, but also functions of at least one of a fundus camera, a scanning laser ophthalmoscope, a slit lamp microscope, and a surgical microscope. Further, the ophthalmic apparatus has a function of measuring optical characteristics of the subject's eye. Examples of the ophthalmic apparatus having the function of measuring optical characteristics of the subject's eye include a refractometer, a keratometer, a tonometer, a wave front analyzer, a specular microscope, a perimeter, and the like. The ophthalmic apparatus according to some embodiments has a function of a laser treatment apparatus used for laser treatment.

The ophthalmic information processing apparatus generates a plurality of images (tomographic images or front images) with different cross-sectional orientations from each other from acquired three-dimensional OCT data of the subject's eye, and outputs estimation information (classification information) for estimating (classifying) whether or not the subject's eye is a glaucoma eye (normal eye) from the generated images.

Hereinafter, a case where the ophthalmic information processing apparatus, the ophthalmic apparatus, the ophthalmic information processing method, and the program according to the embodiments are applied to determination processing (classification) of glaucoma will be described. However, the field of application of the ophthalmic information processing apparatus, the ophthalmic apparatus, the ophthalmic information processing method, and the program according to the embodiment is not limited to the determination processing of glaucoma, but can be applied to all diseases of the subject's eye. For example, examples of the disease of the subject's eye include age-related macular degeneration and diabetic retinopathy, in addition to glaucoma.

In this way, by making it possible to provide doctors (physicians) and others with estimation information indicating whether or not the subject's eye has glaucoma, an effective treatment for controlling the progression of glaucoma can be determined at an early stage. This allows to increase the possibility of controlling the progression of glaucoma.

For example, in cases where a fundus disease is determined to be glaucoma, the appropriate treatment can be selected among drug therapy, laser therapy, surgery, etc., depending on the pathology of the disease.

The ophthalmic information processing apparatus according to the embodiments can estimate whether or not the subject's eye is the glaucoma eye, using learned model obtained by performing machine learning for each of the images generated from the three-dimensional OCT data.

An ophthalmic system according to the embodiments includes the ophthalmic information processing apparatus. An ophthalmic information processing method according to the embodiments is performed by the ophthalmic information processing apparatus. A program according to the embodiments causes a computer to execute each step of the ophthalmic information processing method. A recording medium according to the embodiments is a non-transitory recording medium (storage medium) on which the program according to the embodiments is recorded.

Hereinafter, in this specification, the processor includes, for example, a circuit(s) such as, for example, a CPU (central processing unit), a GPU (graphics processing unit), an ASIC (application specific integrated circuit), and a PLD (programmable logic device). Examples of PLD include a simple programmable logic device (SPLD), a complex programmable logic device (CPLD), and a field programmable gate array (FPGA). The processor realizes, for example, the function according to the embodiments by reading out a computer program stored in a storage circuit or a storage device and executing the computer program. At least a part of the storage circuit or the storage apparatus may be included in the processor. Further, at least a part of the storage circuit or the storage apparatus may be provided outside of the processor.

[Ophthalmic System]

FIG. 1 shows a block diagram of an example of a configuration of the ophthalmic system according to the embodiments. The ophthalmic system 1 according to the embodiments includes an ophthalmic apparatus 10, an ophthalmic information processing apparatus (ophthalmic image processing apparatus, ophthalmic analysis apparatus) 100, an operation apparatus 180, and a display apparatus 190.

The ophthalmic apparatus 10 performs OCT on the subject's eye, and acquires three-dimensional OCT data of the subject's eye. In the present embodiment, the ophthalmic apparatus 10 acquires OCT data of the fundus by scanning the fundus of the subject's eye. The ophthalmic apparatus 10 can acquire a plurality of images of the fundus from the acquired OCT data of the fundus of the subject's eye. The images of the fundus include a tomographic image of the fundus, and a front image of the fundus. Examples of the tomographic image of the fundus include a B-scan image, and the like. Examples of the front image of the fundus include a C-scan image, an en-face image, a shadowgram, a projection image, and the like. The ophthalmic apparatus 10 transmits the acquired OCT data of the subject's eye or the acquired data of the images to the ophthalmic information processing apparatus 100.

In some embodiments, the ophthalmic apparatus 10 and the ophthalmic information processing apparatus 100 are connected via a data communication network. The ophthalmic information processing apparatus 100 according to some embodiments receives the above data from one of a plurality of ophthalmic apparatuses 10 selectively connected via the data communication network.

The ophthalmic information processing apparatus 100 generates first estimation information for estimating whether or not the subject's eye is the glaucoma eye using individual estimation model (learned model) obtained by performing machine learning for each of the images generated from the three-dimensional OCT data. The ophthalmic information processing apparatus 100 generates second estimation information for estimating whether or not the subject's eye is the glaucoma eye from a plurality of first estimation information generated for each of the plurality of images, using a classification model (learned model) obtained by performing machine learning.

In the following, a case where five different images are generated from the three-dimensional OCT data will be described. The five images are a B-scan image in a horizontal direction passing through a center of a optic disc (or near), a B-scan image in a vertical direction passing through the center of the optic disc (or near), a B-scan image in the vertical direction passing through a fovea (or near), a projection image, and an en-face image. However, the configuration according to the embodiments is not limited to the type of images or the number of types of images generated from the three-dimensional OCT data. For example, a plurality of images including B-scan images in a cross-sectional orientation intersecting a line connecting the optic disc and the fovea may be generated from the three-dimensional OCT data, and the above estimation information may be acquired based on the generated plurality of images.

In some embodiments, the ophthalmic information processing apparatus 100 builds the learned model described above and outputs the estimation information using the built learned model. In some embodiments, the ophthalmic information processing apparatus 100 outputs the estimation information using the learned model built outside the ophthalmic information processing apparatus 100. In some embodiments, the ophthalmic information processing apparatus 100 builds the learned model described above and outputs the built learned model to an external device.

The operation apparatus 180 and the display apparatus 190 provide the function for exchanging information between the ophthalmic information processing apparatus 100 and the user, such as displaying information, inputting information, and inputting operation instructions, as a user interface unit. The operation apparatus 180 includes an operating device such as a lever, a button, a key, and pointing device. The operation apparatus 180 according to some embodiments includes a microphone for inputting information using sound. The display apparatus 190 includes a display device such as a flat-panel display. In some embodiments, the functions of the operation apparatus 180 and the display apparatus 190 are realized using a device in which a device having an input function such as a touch panel display and a device having a display function are integrated. In some embodiments, the operation apparatus 180 and the display apparatus 190 include a graphical user interface (GUI) for inputting and outputting information.

[Ophthalmic Apparatus]

Figure 2:
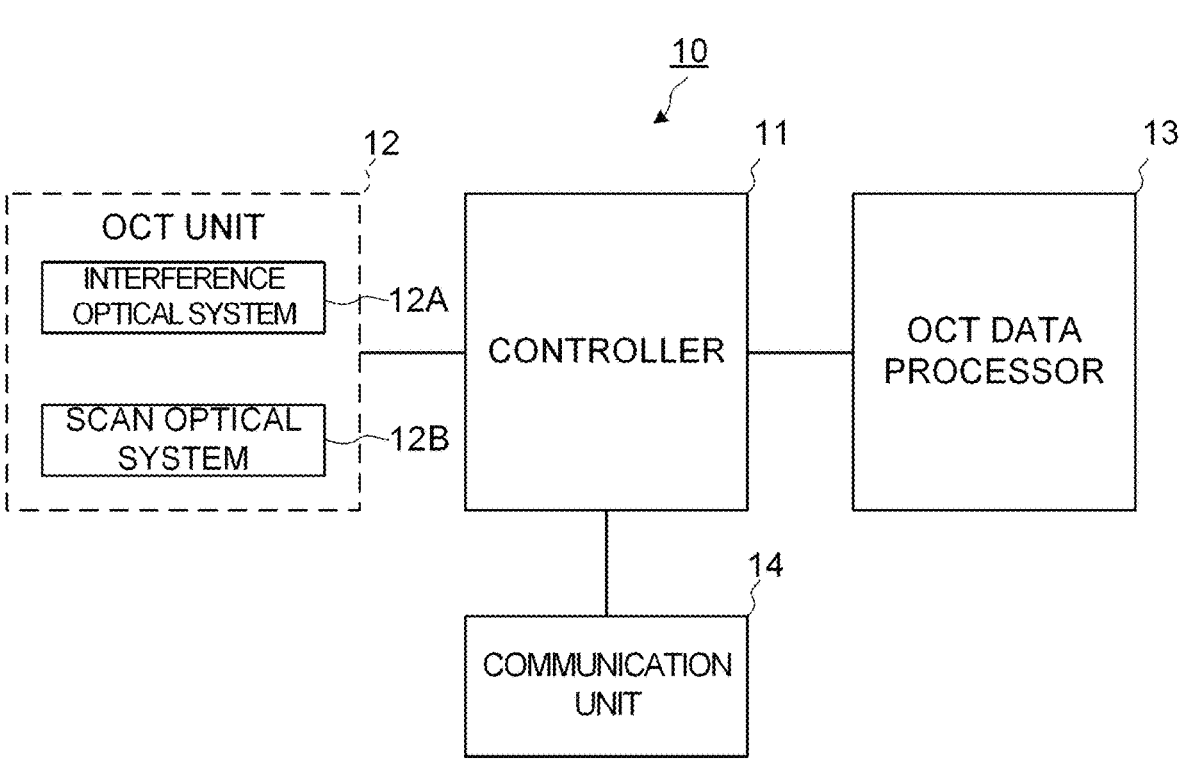
FIG. 2 is a schematic diagram illustrating an example of a configuration of an ophthalmic apparatus according to the embodiments.

FIG. 2 shows a block diagram of an example of a configuration of the ophthalmic apparatus 10 according to the embodiments.

The ophthalmic apparatus 10 includes an optical system for acquiring the OCT data of the subject's eye. The ophthalmic apparatus 10 has a function of performing swept source OCT, but the embodiments are not limited to this. For example, the type of OCT is not limited to swept source OCT, and it may be the spectral domain OCT or the like. The swept source OCT is a technique that splits light from a wavelength sweeping type (i.e., a wavelength scanning type) light source into measurement light and reference light: superposes the measurement light returning from the object to be measured (subject's eye) with the reference light to generate interference light; detects the interference light with a balanced photodiode or the like; and applies the Fourier transform etc. to the detection data acquired through the tuning of wavelengths and the scanning of the measurement light to form an image. The spectral domain OCT is a technique that splits light from a low coherence light source into measurement light and reference light: superposes the measurement light returning from the object to be measured with the reference light to generate interference light: detects the spectral distribution of the interference light with a spectrometer; and applies the Fourier transform etc. to the detected spectral distribution to form an image.

The ophthalmic apparatus 10 includes a controller 11, an OCT unit 12, an OCT data processor 13, and a communication unit 14.

The controller 11 controls each part of the ophthalmic apparatus 10. In particular, the controller 11 controls the OCT unit 12, the OCT data processor 13, and the communication unit 14.

The OCT unit 12 acquires the three-dimensional OCT data of the subject's eye by scanning the subject's eye using OCT. The OCT unit 12 includes an interference optical system 12A and a scan optical system 12B.

The interference optical system 12A splits light from the light source (wavelength sweeping type light source) into measurement light and reference light, makes returning light of the measurement light through the subject's eye and the reference light having traveled through a reference optical path interfere with each other to generate interference light, and detects the interference light. The interference optical system 12A includes at least a fiber coupler and an optical receiver such as a balanced photodiode. The fiber coupler splits the light from the light source into the measurement light and the reference light, and makes returning light of the measurement light through the subject's eye and the reference light having traveled through a reference optical path interfere with each other to generate interference light. The optical receiver detects the interference light generated by the fiber coupler. The interference optical system 12A may include the light source.

The scan optical system 12B changes an incident position of the measurement light on the fundus of the subject's eye by deflecting the measurement light generated by the interference optical system 12A, under the control of the controller 11. The scan optical system 12B includes, for example, an optical scanner disposed at a position substantially conjugate optically to a pupil of the subject's eye. The optical scanner includes, for example, a first galvano mirror that deflects the measurement light in the horizontal direction, a second galvano mirror that deflects the measurement light in the vertical direction, and a mechanism that independently drives the galvano mirrors. For example, the second galvano mirror is configured to further deflect the measurement light deflected by the first galvano mirror. With this, the fundus plane can be scanned with the measurement light in an arbitrary direction.

A detection result (detection signal) of the interference light obtained by the interference optical system 12A is an interference signal indicating the spectrum of the interference light.

The OCT data processor 13 forms three-dimensional data (image data) of the fundus based on the data of the subject's eye acquired by the OCT unit 12, under the control of the controller 11.

In some embodiments, the OCT data processor 13 forms a reflection intensity profile for each A-line to formed a plurality of reflection intensity profiles, and forms the three-dimensional OCT data (scan data) by arranging the formed plurality of reflection intensity profiles in a B-scan direction (for example, intersecting direction of the A-scan direction (for example, z direction), x direction) and a direction (for example, y direction) intersecting both of the A-scan direction and the B-scan direction.

Further, for example, the OCT data processor 13 can form an A-scan image of the subject's eye E, by applying imaging processing to the reflection intensity profile in the A-line. The OCT data processor 13 can form a three-dimensional image by arranging a plurality of A-scan images, each of which is formed for each A-line, in the B-scan direction and the direction intersecting both of the A-scan direction and the B-scan direction.

The processing performed by the OCT data processor 13 includes noise removal (noise reduction), filtering, fast Fourier transform (FFT), and the like. The image data acquired in this manner is a data set including a group of image data formed by imaging the reflection intensity profiles in a plurality of A-lines. Here, the A-lines are the paths of the measurement light in the subject's eye. In order to improve the image quality, it is possible to repeatedly perform scan with the same pattern a plurality of times to acquire a plurality of data sets, and to compose (i.e., average) the plurality of data sets.

In some embodiments, the OCT data processor 13 performs various kinds of data processing (image processing) and various kinds of analysis processing on the images. For example, the OCT data processor 13 performs correction processing, such as brightness correction and dispersion correction of images. The OCT data processor 13 can form volume data (voxel data) of the subject's eye by performing known image processing such as interpolation processing for interpolating pixels between tomographic images. In the case of displaying an image based on the volume data, the OCT data processor 13 performs rendering processing on the volume data so as to form a pseudo three-dimensional image viewed from a specific line-of-sight direction.

Each of the controller 11 and the OCT data processor 13 includes a processor. The function of the controller 11 is realized by a control processor. The functions of the OCT data processor 13 is realized by a data processing processor. In some embodiments, both of the functions of the controller 11 and the OCT data processor 13 are realized by a single processor.

As described above, the processor realizes, for example, the function according to the embodiments by reading out a program stored in a storage circuit or a storage device and executing the program. At least a part of the storage circuit or the storage apparatus may be included in the processor. Further, at least a part of the storage circuit or the storage apparatus may be provided outside of the processor.

The storage apparatus, etc. stores various types of data. Examples of the data stored in the storage apparatus, etc. include data (measurement data, photographic data, etc.) acquired by the OCT unit 12 and information related to the subject and the subject's eye. The storage apparatus, etc. may store a variety of computer programs and data for the operation of each part of the ophthalmic apparatus 10.

The communication unit 14 performs communication interface processing for transmitting or receiving information with the ophthalmic information processing apparatus 100 under the control of the controller 11.

The ophthalmic apparatus 10 according to some embodiments transmits the image data of the subject's eye formed by the OCT data processor 13 to the ophthalmic information processing apparatus 100.

The ophthalmic apparatus 10 according to some embodiments includes a fundus camera for acquiring an image of the fundus of the subject's eye, a scanning laser ophthalmoscope for acquiring an image of the fundus of the subject's eye, or a slit lamp microscope. In some embodiments, the fundus image acquired by the fundus camera is a fluorescein fluorescence fundus angiogram or a fundus autofluorescnece inspection image.

[Ophthalmic Information Processing Apparatus]

Figure 3:
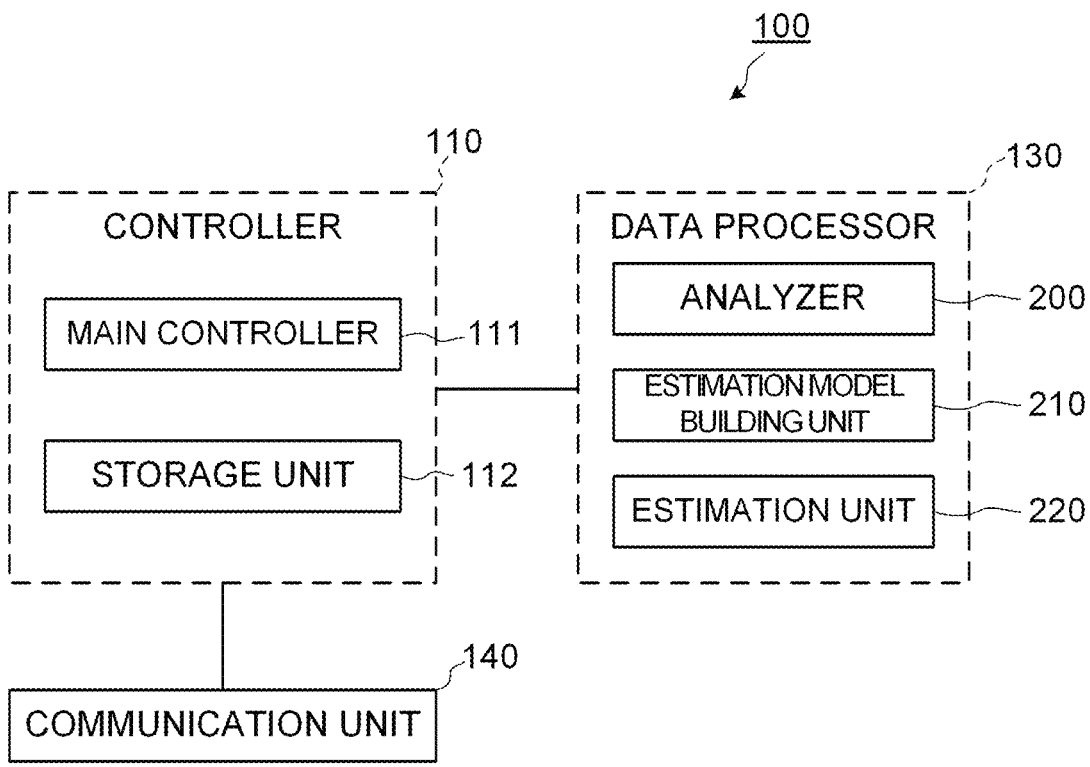
FIG. 3 is a schematic diagram illustrating an example of a configuration of an ophthalmic information processing apparatus according to the embodiments.
Figure 4:
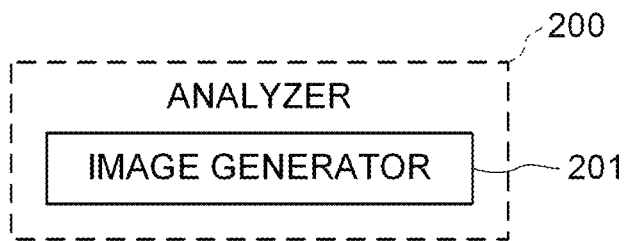
FIG. 4 is a schematic diagram illustrating an example of the configuration of the ophthalmic information processing apparatus according to the embodiments.
Figure 5:
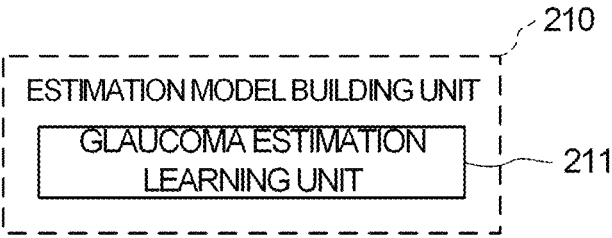
FIG. 5 is a schematic diagram illustrating an example of the configuration of the ophthalmic information processing apparatus according to the embodiments.
Figure 6:
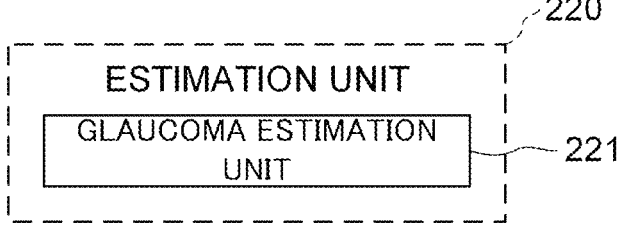
FIG. 6 is a schematic diagram illustrating an example of the configuration of the ophthalmic information processing apparatus according to the embodiments.

FIGS. 3 to 6 show block diagrams of examples of an configuration of the ophthalmic information processing apparatus 100 according to the embodiments. FIG. 3 shows a functional block diagram of the ophthalmic information processing apparatus 100. FIG. 4 shows a functional block diagram of an analyzer 200 in FIG. 3. FIG. 5 shows a functional block diagram of an estimation model building unit 210 in FIG. 3. FIG. 6 shows a functional block diagram of an estimation unit 220 in FIG. 3.

The ophthalmic information processing apparatus 100 includes a controller 110, a data processor 130, and a communication unit 140. In some embodiments, the ophthalmic information processing apparatus 100 includes an image forming unit having the same functions as the OCT data processor 13 in the ophthalmic apparatus 10.

The controller 110 controls each part of the ophthalmic information processing apparatus 100. In particular, the controller 110 controls the data processor 130 and the communication unit 140. The controller 110 includes a main controller 111 and a storage unit 112.

The controller 110 controls each part of the ophthalmic system 1 based on operation instruction signal corresponding to the operation content of the user on the operation apparatus 180.

Each of the controller 110 and the data processor 130 includes a processor. The functions of the data processor 130 is realized by a data processing processor. In some embodiments, both of the functions of the controller 110 and the data processor 130 are realized by a single processor.

The storage unit 112 stores various types of data. Examples of the data stored in the storage unit 112 include data (measurement data, photographic data, etc.) acquired by the ophthalmic apparatus 10, data processing result(s) obtained by the data processor 130, information related to the subject and the subject's eye, and the like. The storage unit 112 may store a variety of computer programs and data for the operation of each part of the ophthalmic information processing apparatus 100.

The communication unit 140 performs communication interface processing for transmitting or receiving information with the communication unit 14 in the ophthalmic information processing apparatus 100 under the control of the controller 110.

The data processor 130 can generate images with designated any cross-sectional orientation (direction), by applying various rendering (or image generating processing) to the three-dimensional OCT data from the ophthalmic apparatus 10. In the present embodiment, the data processor 130 generates a plurality of images with different cross-sectional orientations from each other. The plurality of images include a B-scan image, a C-scan image, an en-face image, a projection image, a shadowgram, and the like. The image with an arbitrary cross-section such as the B-scan image or the C-scan image is formed by selecting pixels (voxels) on a designated cross-section from the three-dimensional OCT data (image data). The en-face image is formed by flattening a part of the three-dimensional OCT data (image data). The projection image is formed by projecting the three-dimensional OCT data in a predetermined direction (z direction, depth direction, A-scan direction). The shadowgram is formed by projecting a part of the three-dimensional OCT data (for example, partial data corresponding to a specific layer) in a predetermined direction.

In some embodiments, at least one of the cross-sectional position and cross-sectional orientation is designated by the user's operation on the operation apparatus 180. The user can designate at least one of the cross-sectional position and the cross-sectional orientation using the operation apparatus 180 while referring to the front image of the fundus generated from the three-dimensional OCT data or the fundus image acquired using the fundus camera not shown.

In some embodiments, the data processor 130 identifies at least one of the cross-sectional position and the cross-sectional orientation by analyzing the OCT data. In this case, the data processor 130 can identify a characteristic region by performing known analysis processing, and can identify at least one of the cross-sectional position and the cross-sectional orientation so as to pass through the identified characteristic region. Alternatively, the data processor 130 can identify a characteristic region by performing known analysis processing, and can identify at least one of the cross-sectional position and the cross-sectional orientation so as to avoid the identified characteristic region.

The data processor 130 performs predetermined data processing on the formed image of the subject's eye. Similar to the OCT data processor 13, the data processor 130 can perform various types of data processing (image processing) and various types of analysis processing on the formed image. For example, the data processor 130 performs various correction processes such as brightness correction and dispersion correction of images. The data processor 130 can form volume data (voxel data) of the subject's eye by performing known image processing such as interpolation processing for interpolating pixels between tomographic images. In the case of displaying an image based on the volume data, the data processor 130 performs rendering processing on the volume data so as to form a pseudo three-dimensional image viewed from a specific line-of-sight direction.

It should be noted that, instead of the data processor 130, the OCT data processor 13 in the ophthalmic apparatus 10 may generate the above group of images. In this case, the ophthalmic information processing apparatus 100 acquires the above group of images from the ophthalmic apparatus 10.

Further, the data processor 130 generates glaucoma estimation model for estimating whether or not the subject's eye is the glaucoma eye from the plurality of images generated from the three-dimensional OCT data.

The data processor 130 outputs estimation information for estimating whether or not the subject's eye is the glaucoma eye from the plurality of images of the subject's eye, using the glaucoma estimation model described above.

Such data processor 130 includes the analyzer 200, the estimation model building unit 210, and the estimation unit 220.

The analyzer 200 performs predetermined analysis processing on the image data of the fundus (or the image data of the fundus acquired by the ophthalmic apparatus 10). Examples of the analysis processing include generation processing of a tomographic image with a desired cross-sectional orientation at a desired cross-sectional position. The analysis processing according to some embodiments includes processing of identifying a predetermined sites such as the optic disc or the fovea.

As shown in FIG. 4, the analyzer 200 includes an image generator 201. The image generator 201 generates a plurality of images with different cross-sectional orientations from each other from the three-dimensional OCT data acquired by the ophthalmic apparatus 10. Examples of the plurality of images include a B-scan image, a C-scan image, an en-face image, a projection image, a shadowgram, and the like.

The image generator 201 can generate at least one image whose cross-sectional position and cross-sectional orientation are designated by the user, from the three-dimensional OCT data. Further, the image generator 201 can generate at least one image whose cross-sectional position and the cross-sectional orientation are designated so as to pass through a predetermined site identified in the analysis processing performed by the analyzer 200. Further, the image generator 201 can generate at least one image whose cross-sectional position and the cross-sectional orientation are designated so as to avoid a predetermined site identified in the analysis processing performed by the analyzer 200.

In the present embodiment, the image generator 201 generates five types of images with different cross-sectional orientations from each other from the three-dimensional OCT data of the subject's eye. The five types of images are a B-scan image (first B-scan image) in the horizontal direction passing through a center of a optic disc (or near), a B-scan image (second B-scan image) in the vertical direction passing through the center of the optic disc (or near), a B-scan image (third B-scan image) in the vertical direction passing through a fovea (or near), a projection image, and an en-face image.

Here, the three B-scan images described above are B-scan images (cropping images) obtained by cropping a range from a first depth position to a second depth position. The first depth position is a position shifted by a first number of pixels (e.g., 256 pixels) in a depth direction (z direction, traveling direction of the measurement light, optical axis direction of the interference optical system) toward a vitreous body with reference to a predetermined layer region in the fundus of the subject's eye. The second depth position is a position shifted by a second number of pixels (e.g., 256 pixels) in the depth direction toward a choroid with reference to the predetermined layer region. For example, the predetermined layer region is a layer region shifted in the depth direction by a third number of pixels (e.g., 50 pixels) toward the choroid from an average of depth positions of an inner limiting membrane identified based on the three-dimensional OCT data of the subject's eye. At least one of the three B-scan images described above may be the cropping image described above. The cropping image is generated by the image generator 201, for example.

The projection image is an integrated image of all layers in the depth direction. The en-face image is an integrated image of a predetermined depth (e.g., 50 micrometers) from the uppermost layer of the retina (e.g., inner limiting membrane) in the depth direction. That is, the en-face image is, for example, an image obtained by projecting a layer region deeper than a layer region corresponding to the inner limiting membrane.

The estimation model building unit 210 builds the glaucoma estimation model (estimation model and classification model described above) for estimating whether or not the subject's eye is the glaucoma eye, as described above.

The estimation model building unit 210 includes a glaucoma estimation learning unit 211, as shown in FIG. 5. The estimation unit 220 includes a glaucoma estimation unit 221, as shown in FIG. 6.

Figure 7:
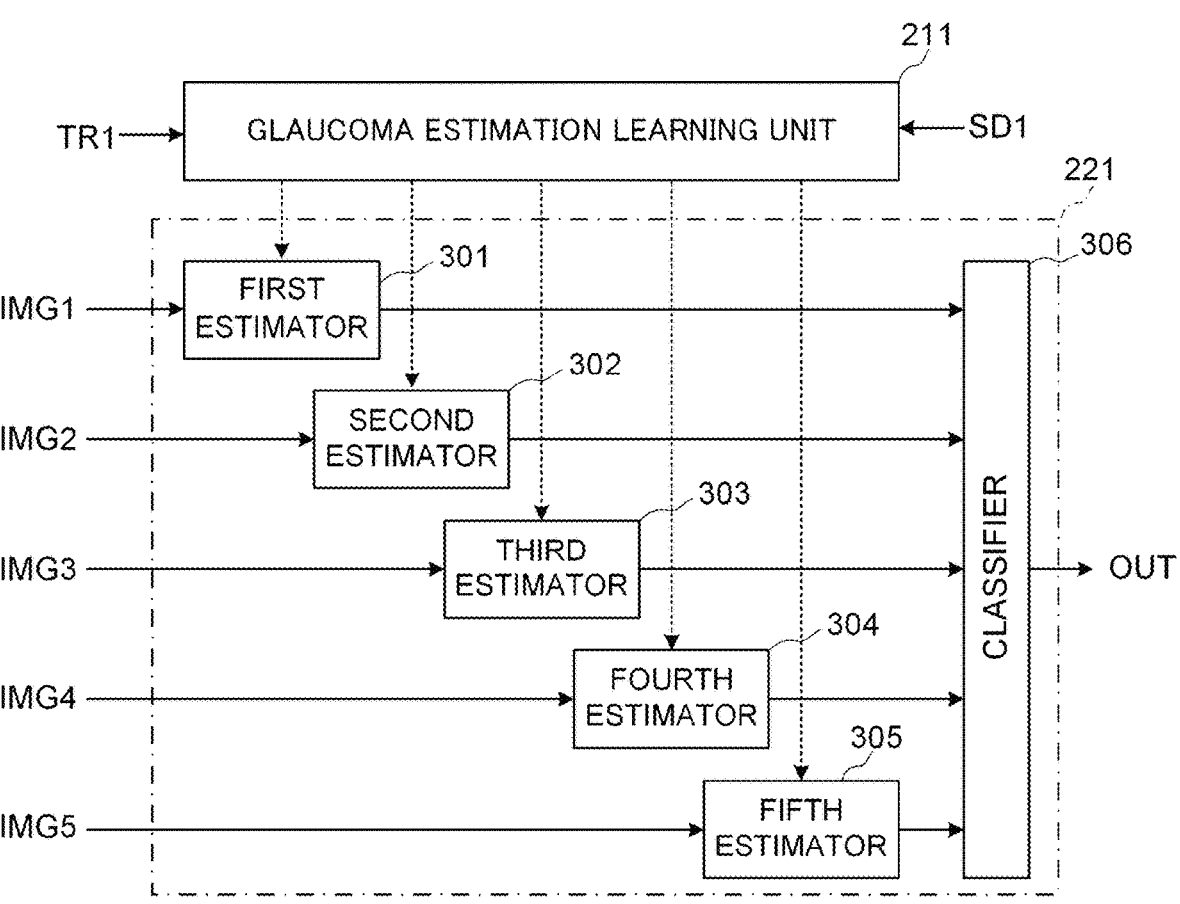
FIG. 7 is a schematic diagram illustrating an example of the configuration of the ophthalmic information processing apparatus according to the embodiments.

FIG. 7 shows a schematic diagram for explaining the operation of the ophthalmic information processing apparatus 100 according to the embodiments. FIG. 7 schematically represents the relationship between the estimation model building unit 210 and the estimation unit 220. In FIG. 7, the relationship between the glaucoma estimation unit 221 and the glaucoma estimation learning unit 211 is illustrated. In FIG. 7, like reference numerals designate like parts as in FIG. 5 or FIG. 6. The same description may not be repeated.

The glaucoma estimation learning unit 211 generates a plurality of individual estimation models for estimating whether or not the subject's eye is the glaucoma eye for each of the plurality of images generated from the three-dimensional OCT data. The glaucoma estimation learning unit 211 generates the plurality of individual estimation models by performing supervised machine learning for each of the plurality of images. In some embodiments, the glaucoma estimation learning unit 211 generates the plurality of individual estimation models by performing transfer learning.

When the five types of images are generated from the three-dimensional OCT data as described above, the glaucoma estimation learning unit 211 generates the individual estimation models for each type of image.

For example, for a B-scan image IMG1 in the horizontal direction passing through the center of the optic disc (or near), the glaucoma estimation learning unit 211 generates the individual estimation model for the B-scan image IMG1 by performing supervised machine learning. Here, in the supervised machine learning, the B-scan images IMG1 of the multiple other eyes, excluding the eye to be estimated, are used as training data TR1, and the label representing the result of judgment by a doctor or other person on each B-scan image as to whether or not the subject's eye has glaucoma is used as teaching data SD1. The function of the individual estimation model for the B-scan image IMG1 is realized by a first estimator 301 shown in FIG. 7.

For example, for a B-scan image IMG2 in the vertical direction passing through the center of the optic disc (or near), the glaucoma estimation learning unit 211 generates the individual estimation model for the B-scan image IMG2 by performing supervised machine learning. Here, in the supervised machine learning, the B-scan images IMG2 of the multiple other eyes, excluding the eye to be estimated, are used as training data TR1, and the label representing the result of judgment by the doctor or other person on each B-scan image as to whether or not the subject's eye has glaucoma is used as teaching data SD1. The function of the individual estimation model for the B-scan image IMG2 is realized by a second estimator 302 shown in FIG. 7.

For example, for a B-scan image IMG3 in the vertical direction passing through the fovea (or near), the glaucoma estimation learning unit 211 generates the individual estimation model for the B-scan image IMG3 by performing supervised machine learning. Here, in the supervised machine learning, the B-scan images IMG3 of the multiple other eyes, excluding the eye to be estimated, are used as training data TR1, and the label representing the result of judgment by a doctor or other person on each B-scan image as to whether or not the subject's eye has glaucoma is used as teaching data SD1. The function of the individual estimation model for the B-scan image IMG3 is realized by a third estimator 303 shown in FIG. 7.

For example, for a projection image IMG4, the glaucoma estimation learning unit 211 generates the individual estimation model for the projection image IMG4 by performing supervised machine learning. Here, in the supervised machine learning, the projection image IMG4 of the multiple other eyes, excluding the eye to be estimated, are used as training data TR1, and the label representing the result of judgment by the doctor or other person on each projection image as to whether or not the subject's eye has glaucoma is used as teaching data SD1. The function of the individual estimation model for the projection image IMG4 is realized by a fourth estimator 304 shown in FIG. 7.

For example, for an en-face image IMG5, the glaucoma estimation learning unit 211 generates the individual estimation model for the en-face image IMG5 by performing supervised machine learning. Here, in the supervised machine learning, the en-face image IMG5 of the multiple other eyes, excluding the eye to be estimated, are used as training data TR1, and the label representing the result of judgment by the doctor or other person on each en-face image as to whether or not the subject's eye has glaucoma is used as teaching data SD1. The function of the individual estimation model for the en-face image IMG5 is realized by a fifth estimator 305 shown in FIG. 7.

Further, the glaucoma estimation learning unit 211 generates a classification model for estimating whether or not the subject's eye is the glaucoma eye from the plurality of estimation information that are output from the generated plurality of individual estimation models. The glaucoma estimation learning unit 211 generates the classification model by performing unsupervised machine learning or supervised machine learning.

For example, the glaucoma estimation learning unit 211 generates the classification model by performing unsupervised machine learning or supervised machine learning using the image groups IMG1 to IMG5 of the multiple other subject's eyes, excluding the subject's eye to be estimated, as training data TR1. When supervised machine learning is performed, labels indicating whether or not the subject's eye for training is the glaucoma eyes are used as teaching data SR1. The function of this classification model is realized by a classifier 306 shown in FIG. 7.

The individual estimation models for images IMG1 to IMG5 and the classification model constitute the glaucoma estimation model. That is, the estimation unit 220 outputs the estimation information for estimating whether or not the subject's eye is the glaucoma eye (whether the subject's eye is the glaucoma eye or the normal eye) from the plurality of images of the subject's eye (plurality of images generated from the OCT data of the subject's eye), using the glaucoma estimation model generated by the glaucoma estimation learning unit 211. In some embodiments, the estimation information includes information representing whether or not the subject's eye is the glaucoma eye. In some embodiments, the estimation information includes information (confidence score information) representing the confidence score that the subject's eye is the glaucoma eye (e.g., the probability estimated to be glaucoma).

Each of the above plurality of individual estimation models may have a similar configuration.

Figure 8:
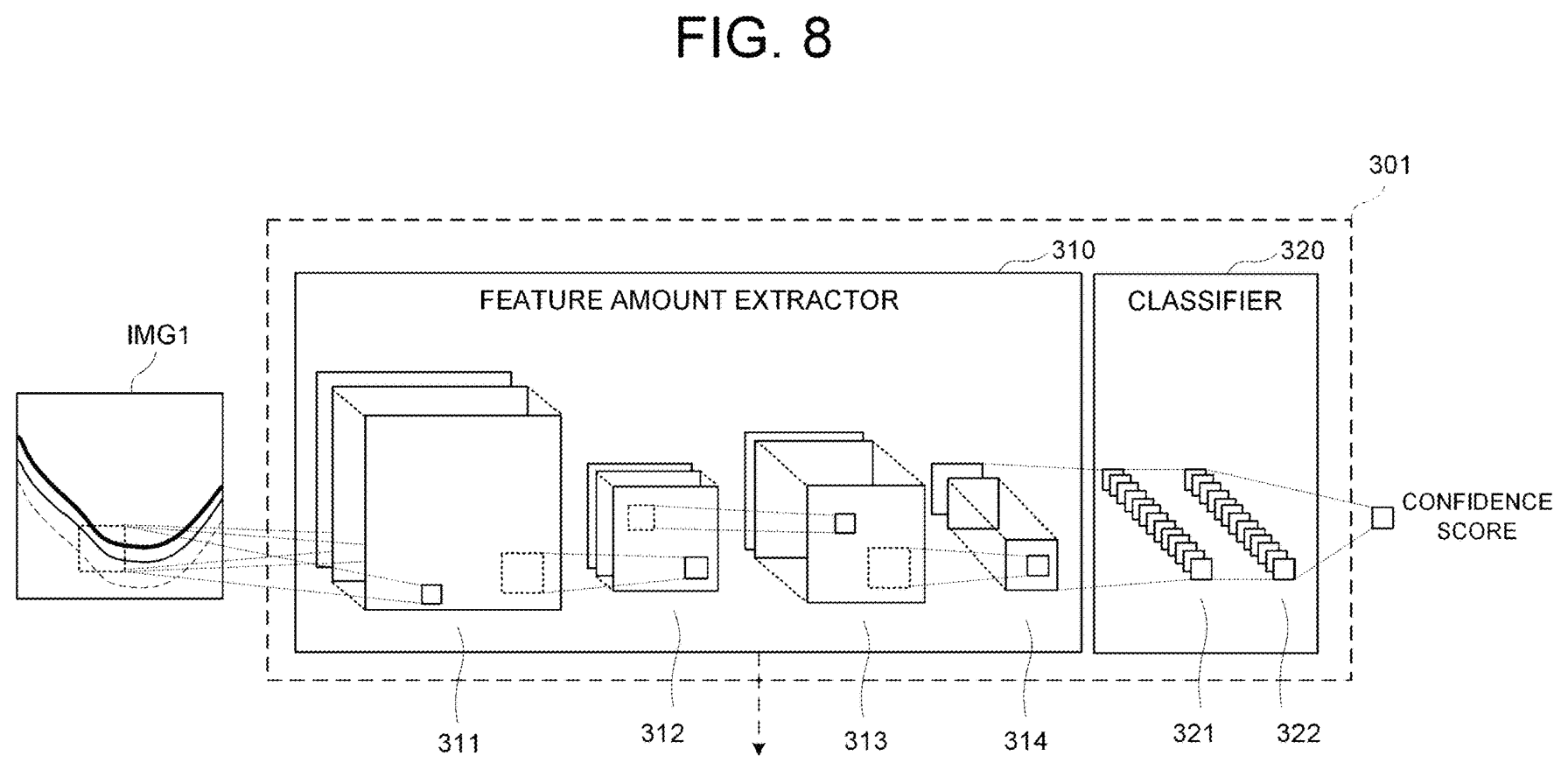

FIG. 8 shows a block diagram of an example of a configuration of the first estimator 301 according to the embodiments. Each of the second estimator 302 to the fifth estimator 305 may have the same configuration as in FIG. 8.

The function of the first estimator 301 is realized by a convolutional neural network (CNN), for example. That is, in accordance with the commands from the individual estimation model (learned model) stored in the memory, the computer operates so as to perform the calculation based on the learned weighting coefficients and response functions in the convolutional neural network on the pixel values of the image IMG1 input to the convolution layer 311 of the feature amount extractor 310, which is the input layer, and to output the determination result from the classifier 320, which is the output layer. The first estimator 301 having such a configuration can extract a local correlation pattern while gradually reducing the resolution of the image, and can output the determination result based on the extracted correlation pattern.

The first estimator 301 includes the feature amount extractor 310 and the classifier 320. The feature amount extractor 310 repeats the extraction of the feature amount and the downsampling (filtering) for each predetermined image region with respect to the input image IMG1 and extracts the feature amount of the determination image. The classifier 320 outputs the estimation information (e.g., confidence score) for estimating whether or not the subject's eye is the glaucoma eye, based on the feature amount extracted by the feature amount extractor 310.

The feature amount extractor 310 includes a plurality of units in which units are connected in a plurality of stages. Each unit includes a convolution layer and a pooling layer. In each unit, the inputs of the pooling layer are connected to the outputs of the convolution layer. The pixel values of the corresponding pixels in the image IMG1 are input to the inputs of the convolution layer in the first stage. The inputs of the convolution layer in the latter stage are connected to the outputs of the pooling layer in the previous stage.

In FIG. 8, the feature amount extractor 310 includes two units connected in two stages. That is, in the feature amount extractor 310, the unit including the convolution layer 313 and the pooling layer 314 is connected to the subsequent stage of the unit including the convolution layer 311 and the pooling layer 312. The outputs of the pooling layer 312 are connected to the inputs of the convolution layer 313.

The classifier 320 includes fully connected layers 321 and 322. The outputs of the fully connected layer 321 are connected to the inputs of the fully connected layer 322.

In the feature amount extractor 310 and the classifier 320, learned weighting coefficients are assigned between the neurons in the two connected layers. Each neuron performs calculation using a response function on calculation result in which weighting coefficient(s) from one or more input neurons is/are added, and outputs the obtained calculation result to a neuron in the next stage.

The weighting coefficient(s) is/are updated by performing known machine learning using the images of the eyes of the two or more subjects acquired in the past (B-scan images in the horizontal direction passing through the optic disc (or near)) as training data and labels labeled by the doctors and others for each image as teaching data. The existing weighting coefficient(s) is/are updated by performing machine learning using the images acquired in the past as training data. In some embodiments, the weighting coefficient(s) is/are updated by transfer learning.

The first estimator 301 may have a known layered structure such as VGG16, VGG19, InceptionV3, ResNet18, ResNet50, Xception. The classifier 320 may have a configuration such as random forest, support vector machine (SVM).

The classifier 306 in the glaucoma estimation unit 221 is, for example, generated by performing known machine learning using the images IMG1 through IMG5 of the eyes of the two or more subjects acquired in the past as training data and labels labeled by the doctors and others for each image as teaching data. The classifier 306 outputs information OUT indicating whether or not the subject's eye is the glaucoma eye, or the confidence score information OUT indicating the confidence score that the subject's eye is the glaucoma eye, based on the plurality of estimation information from the first estimator 301 to the fifth estimator 305. In some embodiments, the classifier 306 outputs the information OUT indicating whether or not the subject's eye is the glaucoma eye, or the confidence score information OUT indicating the confidence score that the subject's eye is the glaucoma eye, based on a plurality of feature amounts each of which is extracted from a predetermined layer in each of the first estimator 301 to the fifth estimator 305. The classifier 306 may have a configuration such as random forest, support vector machine (SVM), similar to the classifier 320 shown in FIG. 8.

The ophthalmic apparatus 10, or the communication unit 140 that performs reception processing of the OCT data from the ophthalmic apparatus 10 is an example of the "acquisition unit" according to the embodiments. The B-scan image in the horizontal direction passing through the center of the optic disc (or near), the B-scan image in the vertical direction passing through the center of the optic disc (or near), the B-scan image in the vertical direction passing through the fovea (or near), the projection image, and the en-face image as the five types of images are an example of the "plurality of images" according to the embodiments. The glaucoma estimation unit 221 is an example of the "disease estimation unit" according to the embodiments.

The B-scan image in the horizontal direction passing through the center of the optic disc (or near) is an example of the "first B-scan image" according to the embodiments. The B-scan image in the vertical direction passing through the center of the optic disc (or near) is an example of the "second B-scan image" according to the embodiments. The B-scan image in the vertical direction passing through the fovea (or near) is an example of the "third B-scan image" according to the embodiments.

The individual estimation model for the B-scan image IMG1, the individual estimation model for the B-scan image IMG2, the individual estimation model for the B-scan image IMG3, the individual estimation model for the projection image IMG4, and the individual estimation model for the en-face image IMG5 are an example of the "plurality of learned models" according to the embodiments. The B-scan image is an example of the "tomographic image" according to the embodiments. The projection image or the en-face image is an example of the "front image" according to the embodiments. The glaucoma estimation learning unit 211 is an example of the "learning unit" according to the embodiments. The horizontal direction is an example of the "first cross-sectional orientation" according to the embodiments. The vertical direction is an example of the "second cross-sectional orientation" according to the embodiments.

[Operation Example]

The operation of the ophthalmic information processing apparatus 100 according to the embodiments will be described.

Figure 9:
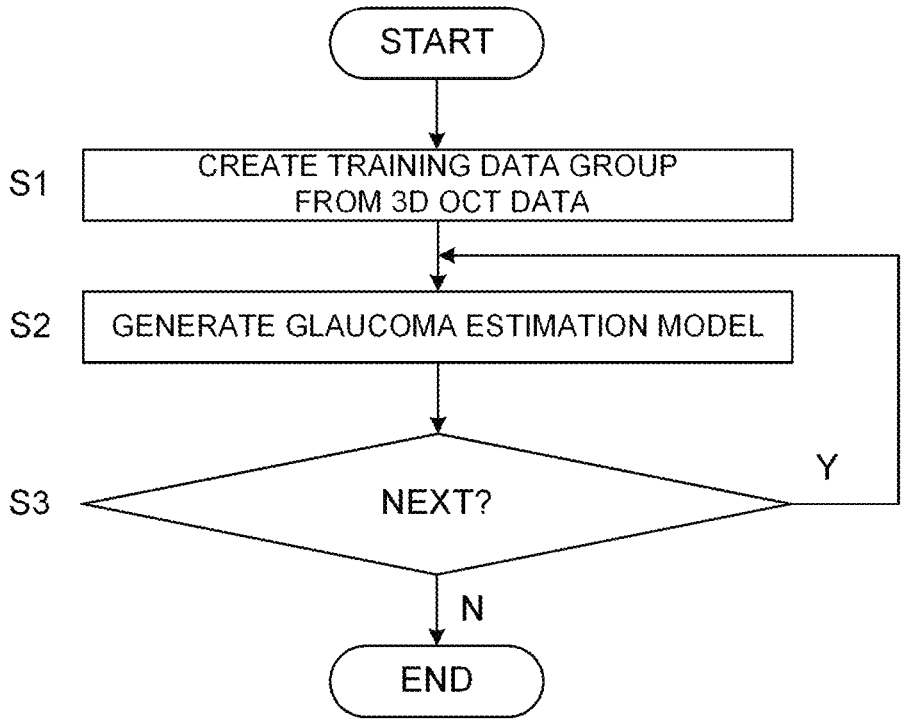
FIG. 9 is a schematic diagram illustrating an example of an operation flow of the ophthalmic information processing apparatus according to the embodiments.
Figure 10:
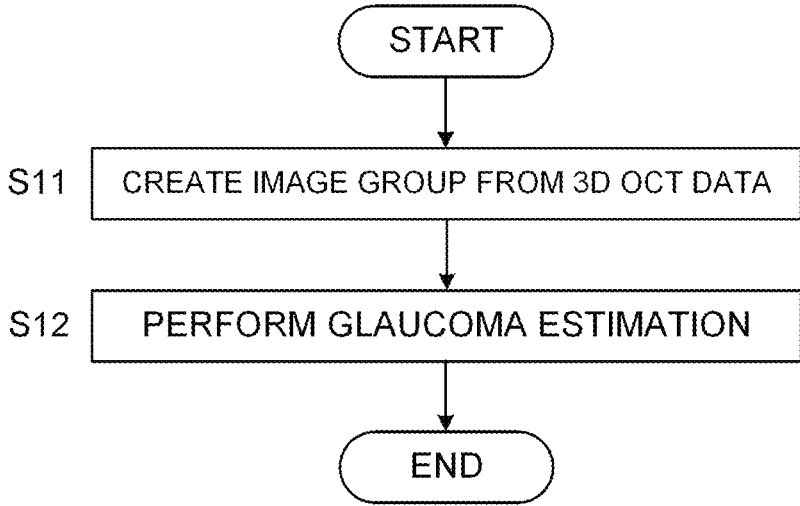
FIG. 10 is a schematic diagram illustrating an example of an operation flow of the ophthalmic information processing apparatus according to the embodiments.

FIGS. 9 and 10 show block diagrams of examples of an operation of the ophthalmic information processing apparatus 100 according to the embodiments. FIG. 9 represents a flow diagram of an example of the generation processing of the learned model for performing glaucoma estimation. FIG. 10 represents a flow diagram of an example of the glaucoma estimation processing using the learned model generated by the generation processing shown in FIG. 9. The storage unit 112 stores computer programs for realizing the processing shown in FIG. 9 and FIG. 10. The controller 110 (main controller 111) can perform the processing shown in FIGS. 9 and 10 by operating according to the computer programs.

In FIG. 9, it is assumed that OCT has been previously performed on the funduses of the eyes of a plurality of subjects, and a plurality of three-dimensional OCT data have been acquired, in the ophthalmic apparatus 10.

(S1: Create Training Data Group from 3D OCT Data)

First, the main controller 111 controls the communication unit 140 to acquire a plurality of three-dimensional OCT data for the eyes of the plurality of subjects acquired in the ophthalmic apparatus 10.

Subsequently, the main controller 111 controls the image generator 201 to generate the above five types of images as a training data group from each of the plurality of three-dimensional OCT data. That is, the image generator 201 generates the B-scan image in the horizontal direction passing through the center of the optic disc (or near), the B-scan image in the vertical direction passing through the center of the optic disc (or near), the B-scan image in the vertical direction passing through the fovea (or near), the projection image, and the en-face image from the three-dimensional OCT data. Furthermore, the image generator 201 applies cropping processing to each of the five generated images to generate cropping images. The doctor or other person reads the generated cropping image (or B-scan image before the cropping processing) and labels a label indicating whether or not the subject's eye is the glaucoma eye. The main controller 111 associates the cropping image with the label and stores it in the storage unit 112.

(S2: Generate Glaucoma Estimation Model)

Next, the main controller 111 controls the glaucoma estimation learning unit 211 to generate an individual estimation model (disease estimation model) for the concerned image for one of the above five types of images. The glaucoma estimation learning unit 211 generates the individual estimation model by performing supervised machine learning as described above.

(S3: Next?)

Subsequently, the main controller 111 determines whether or not to perform generation processing of the individual estimation model for the next image. For example, the main controller 111 determines whether or not to perform generation processing of the individual estimation model for the next image by counting a predetermined number of image types or a number of image types generated in step S1.

When it is determined that the generation processing of the individual estimation model is to be performed for the next image (step S3: Y), the operation of the ophthalmic information processing apparatus 100 proceeds to step S2.

When it is determined that the generation processing of the individual estimation model is not to be performed for the next image (step S3: N), the ophthalmic information processing apparatus 100 terminates the operation (END).

As shown in FIG. 10, the ophthalmic information processing apparatus 100 generates the estimation information for estimating whether or not the subject's eye is the glaucoma eye using the learned model generated in accordance with the flow shown in FIG. 9.

In FIG. 10, it is assumed that OCT has been previously performed on the fundus of the subject's eye to be estimated, and the three-dimensional OCT data has been acquired, in the ophthalmic apparatus 10.

(S11: Create Image Group from 3D OCT Data)

First, the main controller 111 controls the communication unit 140 to acquire the three-dimensional OCT data of the subject's eye to be estimated which has been acquired in the ophthalmic apparatus 10.

Subsequently, the main controller 111 controls the image generator 201 to generate the above five types of images as the image group from the three-dimensional OCT data. That is, the image generator 201 generates the B-scan image in the horizontal direction passing through the center of the optic disc (or near), the B-scan image in the vertical direction passing through the center of the optic disc (or near), the B-scan image in the vertical direction passing through the fovea (or near), the projection image, and the en-face image from the three-dimensional OCT data. Furthermore, the image generator 201 applies cropping processing to each of three-B-scan images among the five generated images to generate cropping images.

(S12: Perform Glaucoma Estimation)

Next, the main controller 111 controls the glaucoma estimation unit 221 to output the estimation information for estimating whether or not the subject's eye is the glaucoma eye for the five types of image groups generated in step S11, using the glaucoma estimation model (individual estimation model for each image) generated by repeating step S2 to step S3 in FIG. 9.

This terminates the operation of the ophthalmic information processing apparatus 100 (END).

Here, in order to evaluate the accuracy of glaucoma classification (determination accuracy) by the ophthalmic information processing apparatus 100 according to the embodiments, the embodiments are contrasted with a comparative example of the embodiments. The ophthalmic information processing apparatus according to the comparative example of the embodiments includes a convolutional neural network that uses any of the five types of images similar to the embodiments as a single input data, and is configured to determine whether or not the subject's eye is the glaucoma eye performing known supervised machine learning.

Figure 11:
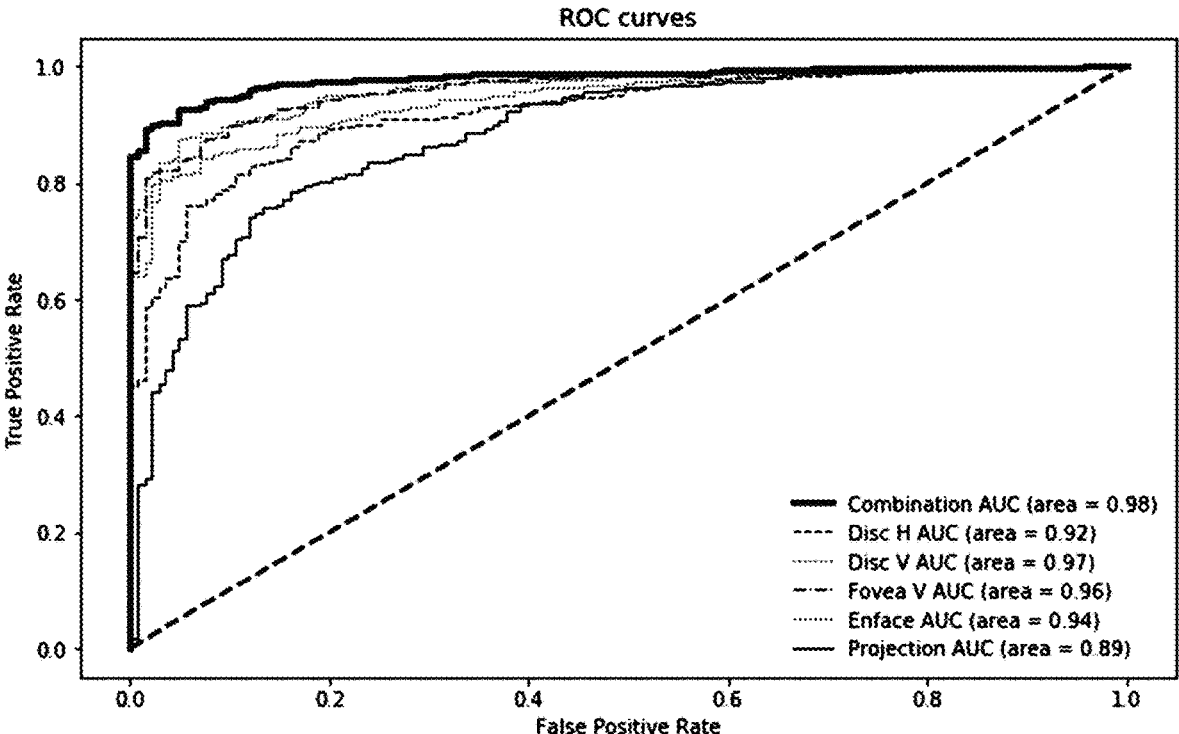
FIG. 11 is a schematic diagram for explaining the operation of the ophthalmic information processing apparatus according to the embodiments.

FIG. 11 shows an example of the Area Under Receiver Operating Characteristic curve (AUROC) obtained by the ophthalmic information processing apparatus 100.

In FIG. 11, the results of the 5-fold cross validation are represented as AUROC using 143 cases of OCT data from normal eyes and 672 cases of OCT data from glaucoma eyes.

Specifically, in the case of classifying whether the subject's eye is the glaucoma eye or the normal eye using the convolutional neural network obtained using only the B-scan image in the horizontal direction passing through the center of the optic disc (or near) (Disc H AUC), AUROC is 0.92. In the case of classifying whether the subject's eye is the glaucoma eye or the normal eye using the convolutional neural network obtained using only the B-scan image in the vertical direction passing through the center of the optic disc (or near) (Disc V AUC), AUROC is 0.97. In the case of classifying whether the subject's eye is the glaucoma eye or the normal eye using the convolutional neural network obtained using only the B-scan image in the vertical direction passing through the fovea (or near) (Fovea V AUC), AUROC is 0.96. In the case of classifying whether the subject's eye is the glaucoma eye or the normal eye using the convolutional neural network obtained using only the projection image (Projection AUC), the AUROC is 0.89. In the case of classifying whether the subject's eye is the glaucoma eye or the normal eye using the convolutional neural network obtained using only the en-face image (Enface AUC), AUROC is 0.94.

In contrast, in the case where the ophthalmic information processing apparatus 100 according to the embodiments classifies whether the subject's eye is the glaucoma eye or the normal eye using the above five types of images as input data (Combination AUC), AUROC is 0.98.

As described above, compared to simply using the convolutional neural network to determine whether or not the subject's eye is the glaucoma eye, the configuration according to the embodiments allow to improve the accuracy of determination (classification accuracy).

Modification Example

The configuration according to the embodiments is not limited to the configuration described above.

The ophthalmic apparatus according to some embodiments has at least one of the function of the ophthalmic information processing apparatus 100, the function of the operation apparatus 180, and the function of the display apparatus 190, in addition to the function of the ophthalmic apparatus 10.

In the following, the ophthalmic apparatus according to a modification example of some embodiments will be described focusing on differences from the ophthalmic apparatus according to the embodiments described above.

Figure 12:
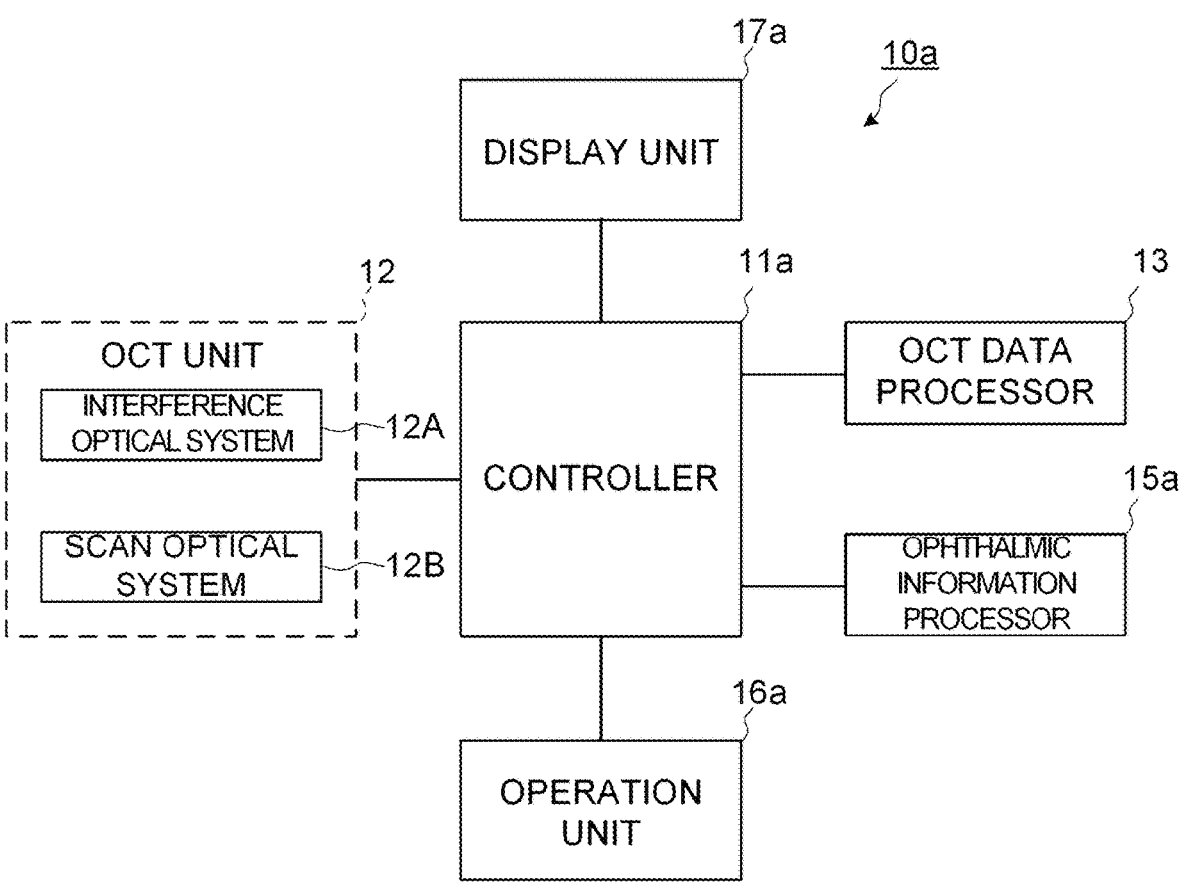
FIG. 12 is a schematic diagram illustrating an example of the configuration of the ophthalmic apparatus according to a modification example of the embodiments.

FIG. 12 shows a block diagram of an example of a configuration of the ophthalmic apparatus 10a according to the modification example of the embodiments. In FIG. 12, components similar to those in FIG. 2 are given the same reference numerals. The description of such components is basically omitted.

The difference between the configuration of the ophthalmic apparatus 10a according to the present modification example and the configuration of the ophthalmic apparatus 10 according to the embodiments described above is that the ophthalmic apparatus 10a has the function of the ophthalmic information processing apparatus 100, the function of the operation apparatus 180, and the function of the display apparatus 190. The ophthalmic apparatus 10a includes a controller 11a, the OCT unit 12, the OCT data processor 13, an ophthalmic information processor 15a, an operation unit 16a, and a display unit 17a.

The controller 11a controls each part of the ophthalmic apparatus 10a. In particular, the controller 11a controls the OCT unit 12, the OCT data processor 13, the ophthalmic information processor 15a, the operation unit 16a, and the display unit 17a.

The ophthalmic information processor 15a has the same configuration as the ophthalmic information processing apparatus 100, and has the same function as the ophthalmic information processing apparatus 100. The operation unit 16a has the same configuration as the operation apparatus 180, and has the same function as the operation apparatus 180. The display unit 17a has the same configuration as the display apparatus 190, and has the same function as the display apparatus 190.

According to the present modification example, the estimation information for estimating whether or not the subject's eye is the glaucoma eye (diseased eye) can be obtained with high accuracy using machine learning using less training data, in a compact configuration. This allows to provide a new technique for applying appropriate treatment for glaucoma at an early stage.

[Actions]

In the following, the ophthalmic information processing apparatus, the ophthalmic apparatus, the ophthalmic information processing method, and the program according to the embodiments will be described.

An ophthalmic information processing apparatus (ophthalmic information processing apparatus 100, ophthalmic information processor 15a) includes an acquisition unit (ophthalmic apparatus 10, or communication unit 140 that performs reception processing of the OCT data from the ophthalmic apparatus 10) and a disease estimation unit (glaucoma estimation unit 221). The acquisition unit is configured to acquire a plurality of images with different cross-sectional orientations from each other of a subject's eye. The disease estimation unit is configured to output estimation information for estimating whether or not the subject's eye is a glaucoma eye from the images, using a plurality of learned models obtained by performing machine learning for each type of the images.

According to such a configuration, the estimation information for estimating whether or not the subject's eye is the glaucoma eye is obtained for each of the images with different cross-sectional orientations from each other, using the learned model obtained by performing machine learning. This allows to detect glaucoma with high accuracy and at an early stage. As a result, appropriate treatment for glaucoma can be provided at early stage.

In some embodiments, the disease estimation unit includes: a plurality of estimators (first estimator 301 to fifth estimator 305) configured to output feature amount or confidence score information that represents confidence score that the subject's eye is the glaucoma eye, using each of the learned models for each type of the images; and a classifier (306) configured to output the estimation information from a plurality of feature amounts or a plurality of confidence score information that are output from the estimators, using a classification model obtained by performing machine learning.

According to such a configuration, since the feature amount or the confidence score information is output for each type of the multiple images using the learned model obtained by performing machine learning and the estimation information is output from the plurality of feature amounts or the plurality of confidence sore information using the classification model obtained by performing machine learning, glaucoma can be detected with high accuracy and at an early stage. As a result, appropriate treatment for glaucoma can be provided at early stage.

In some embodiments, the images include a tomographic image of a fundus of the subject's eye or one or more front images of the fundus of the subject's eye.

According to such a configuration, the image for detecting glaucoma can be easily acquired. As a result, appropriate treatment for glaucoma can be easily provided at early stage.

In some embodiments, the images include a first B-scan image with a first cross-sectional orientation (horizontal direction) passing through an optic disc, a second B-scan image with a second cross-sectional orientation (vertical direction) passing through the optic disc, the second cross-sectional orientation intersecting the first cross-sectional orientation, and a third B-scan image passing through a fovea.

According to such a configuration, glaucoma affecting the morphology of the cross section of the optic disc or the fovea can be detected with high accuracy and at an early stage.

In some embodiments, at least of the first B-scan image, the second B-scan image, or the third B-scan image is a B-scan image (cropping image) obtained by cropping a range from a first depth position to a second depth position, the first depth position being a position shifted by a first number of pixels in a depth direction toward a vitreous body with reference to a predetermined layer region in the fundus of the subject's eye, the second depth position being a position shifted by a second number of pixels in the depth direction toward a choroid with reference to the predetermined layer region.

According to such a configuration, the accuracy of classification of whether or not the subject's eye is the glaucoma eye can be further improved, by increasing the density of information included in the B-scan image.

In some embodiments, the predetermined layer region is a layer region shifted in the depth direction by a third pixel number from an average of depth positions of an inner limiting membrane identified based on a three-dimensional OCT data of the subject's eye.

According to such a configuration, whether or not the subject's eye is the glaucoma eye is classified by focusing on the site of interest, which is considered to be the site where the morphological changes caused by glaucoma are most noticeable. Thereby, the glaucoma can be detected with higher accuracy and at an earlier stage.

In some embodiments, the one or more front images include at least one of an en-face image obtained by projecting a layer region deeper than a layer region corresponding to the inner limiting membrane, or the projection image.

According to such a configuration, glaucoma affecting the morphology of the front of the subject's eye can be detected with high accuracy and at an early stage.

In some embodiments, the ophthalmic information processing apparatus includes a learning unit (glaucoma estimation learning unit 211) configured to generate the learned models by performing supervised machine learning for each type of the images.

According to such a configuration, the ophthalmic information processing apparatus capable of generating the learned model for detecting the glaucoma of the subject's eye with high accuracy at an early stage can be provided.

In some embodiments, the ophthalmic information processing apparatus includes an image generator (201) configured to generate at least one of the images based on three-dimensional OCT data of the subject's eye.

According to such a configuration, the ophthalmic information processing apparatus capable of detecting glaucoma with high accuracy at an early stage by acquiring the three-dimensional OCT data of the subject's eye can be provided.

An ophthalmic apparatus (10, 10a) according to some embodiments includes an OCT unit (12) configured to perform optical coherence tomography on the subject's eye; an image generator (201) configured to generate at least one of the images based on the three-dimensional OCT data acquired by the OCT unit; and the ophthalmic information processing apparatus (100, ophthalmic information processor 15a) described in any one of the above.

According to such a configuration, the ophthalmic apparatus capable of performing optical coherence tomography on the subject's eye and detecting the glaucoma from the acquired OCT data with high accuracy at an early stage can be provided.

An ophthalmic information processing method according to some embodiments includes an acquisition step of acquiring a plurality of images with different cross-sectional orientations from each other of a subject's eye; and a disease estimation step of outputting estimation information for estimating whether or not the subject's eye is a glaucoma eye from the images, using a plurality of learned models obtained by performing machine learning for each type of the images.

According to such a method, the estimation information for estimating whether or not the subject's eye is the glaucoma eye is obtained for each of the images with different cross-sectional orientations from each other, using the learned model obtained by performing machine learning. This allows to detect glaucoma with high accuracy and at an early stage. As a result, appropriate treatment for glaucoma can be provided at early stage.

In some embodiments, the disease estimation step includes: a plurality of estimation steps of outputting feature amount or confidence score information that represents confidence score that the subject's eye is the glaucoma eye, using each of the learned models for each type of the images; and a classification step of outputting the estimation information from a plurality of feature amounts or a plurality of confidence score information that are output from the estimators, using a classification model obtained by performing machine learning.

According to such a method, since the feature amount or the confidence score information is output for each type of the multiple images using the learned model obtained by performing machine learning and the estimation information is output from the plurality of feature amounts or the plurality of confidence sore information using the classification model obtained by performing machine learning, glaucoma can be detected with high accuracy and at an early stage. As a result, appropriate treatment for glaucoma can be provided at early stage.

In some embodiments, the images include a tomographic image of a fundus of the subject's eye or one or more front images of the fundus of the subject's eye.

According to such a method, the image for detecting glaucoma can be easily acquired. As a result, appropriate treatment for glaucoma can be easily provided at early stage.

In some embodiments, the images include a first B-scan image with a first cross-sectional orientation (horizontal direction) passing through an optic disc, a second B-scan image with a second cross-sectional orientation (vertical direction) passing through the optic disc, the second cross-sectional orientation intersecting the first cross-sectional orientation, and a third B-scan image passing through a fovea.

According to such a method, glaucoma affecting the morphology of the cross section of the optic disc or the fovea can be detected with high accuracy and at an early stage.

In some embodiments, at least of the first B-scan image, the second B-scan image, or the third B-scan image is a B-scan image (cropping image) obtained by cropping a range from a first depth position to a second depth position, the first depth position being a position shifted by a first number of pixels in a depth direction toward a vitreous body with reference to a predetermined layer region in the fundus of the subject's eye, the second depth position being a position shifted by a second number of pixels in the depth direction toward a choroid with reference to the predetermined layer region.

According to such a method, the accuracy of classification of whether or not the subject's eye is the glaucoma eye can be further improved, by increasing the density of information included in the B-scan image.

In some embodiments, the predetermined layer region is a layer region shifted in the depth direction by a third pixel number from an average of depth positions of an inner limiting membrane identified based on a three-dimensional OCT data of the subject's eye.

According to such a method, whether or not the subject's eye is the glaucoma eye is classified by focusing on the site of interest, which is considered to be the site where the morphological changes caused by glaucoma are most noticeable. Thereby, the glaucoma can be detected with higher accuracy and at an earlier stage.

In some embodiments, the one or more front images include at least one of an en-face image obtained by projecting a layer region deeper than a layer region corresponding to the inner limiting membrane, or the projection image.

According to such a method, glaucoma affecting the morphology of the front of the subject's eye can be detected with high accuracy and at an early stage.

In some embodiments, the ophthalmic information processing method includes a learning step of generating the learned models by performing supervised machine learning for each type of the images.

According to such a method, the ophthalmic information processing method capable of generating the learned model for detecting the glaucoma of the subject's eye with high accuracy at an early stage can be provided.

In some embodiments, the ophthalmic information processing method includes an image generating step of generating at least one of the images based on three-dimensional OCT data of the subject's eye.

According to such a method, the ophthalmic information processing method capable of detecting glaucoma with high accuracy at an early stage by acquiring the three-dimensional OCT data of the subject's eye can be provided.

A program according to some embodiments causes a computer to execute each step of the ophthalmic information processing method described in any of the above.

According to such a program, the estimation information for estimating whether or not the subject's eye is the glaucoma eye is obtained for each of the images with different cross-sectional orientations from each other, using the learned model obtained by performing machine learning. This allows to detect glaucoma with high accuracy and at an early stage. As a result, appropriate treatment for glaucoma can be provided at early stage.

A program for realizing the ophthalmic information processing method according to some embodiments can be stored in any kind of non-transitory computer-readable recording medium. The recording medium may be an electronic medium using magnetism, light, magneto-optical, semiconductor, or the like. Typically, the recording medium is a magnetic tape, a magnetic disk, an optical disk, a magneto-optical disk, a flash memory, a solid state drive, or the like.

The computer program may be transmitted and received through a network such as the Internet, LAN, etc.

Configurations described above are merely examples for preferably implementing the present invention. One who intends to implement the present invention may arbitrarily modify (omission, replacement, addition, etc.) within the scope of the invention.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An ophthalmic information processing apparatus, comprising:
an acquisition circuit configured to acquire a plurality of images with different cross-sectional orientations from each other of a subject's eye, the images having image types including a B-scan image in a horizontal direction passing through a center of a optic disc or near the center, a B-scan image in a vertical direction passing through the center of the optic disc or near the center, a B-scan image in the vertical direction passing through a fovea or near the fovea, a projection image, and an en-face image; and
a disease estimation circuit configured to output estimation information for estimating whether or not the subject's eye is a glaucoma eye from the images, using a plurality of learned models obtained by performing machine learning for each type of the images,
wherein
the disease estimation circuit includes:
a plurality of estimator circuits configured to output confidence score information that represents confidence score that the subject's eye is the glaucoma eye, using each of the learned models for each type of the images; and
a classifier configured to output the estimation information from a plurality of confidence score information that are output from the estimator circuits, using a classification model obtained by performing machine learning.

2. The ophthalmic information processing apparatus of claim 1, further comprising
a learning circuit configured to generate the learned models by performing supervised machine learning for each type of the images.

3. The ophthalmic information processing apparatus of claim 1, further comprising
an image generator circuit configured to generate at least one of the images based on three-dimensional OCT data of the subject's eye.

4. An ophthalmic apparatus, comprising:
an OCT device including a scanner and configured to perform optical coherence tomography on the subject's eye;
an image generator circuit configured to generate at least one of the images based on the three-dimensional OCT data acquired by the OCT unit; and
an ophthalmic information processing apparatus, wherein
the ophthalmic information processing apparatus, comprising:
an acquisition circuit configured to acquire a plurality of images with different cross-sectional orientations from each other of a subject's eye, the images having image types including a B-scan image in a horizontal direction passing through a center of a optic disc or near the center, a B-scan image in a vertical direction passing through the center of the optic disc or near the center, a B-scan image in the vertical direction passing through a fovea or near the fovea, a projection image, and an en-face image; and
a disease estimation circuit configured to output estimation information for estimating whether or not the subject's eye is a glaucoma eye from the images, using a plurality of learned models obtained by performing machine learning for each type of the images, and the disease estimation circuit includes:

a plurality of estimator circuits configured to output confidence score information that represents confidence score that the subject's eye is the glaucoma eye, using each of the learned models for each type of the images; and a classifier configured to output the estimation information from a plurality of confidence score information that are output from the estimator circuits, using a classification model obtained by performing machine learning.

5. An ophthalmic information processing method, comprising:

an acquisition step of acquiring a plurality of images with different cross-sectional orientations from each other of a subject's eye, the images having image types including a B-scan image in a horizontal direction passing through a center of a optic disc or near the center, a B-scan image in a vertical direction passing through the center of the optic disc or near the center, a B-scan image in the vertical direction passing through a fovea or near the fovea, a projection image, and an en-face image; and a disease estimation step of outputting estimation information for estimating whether or not the subject's eye is a glaucoma eye from the images, using a plurality of learned models obtained by performing machine learning for each type of the images, wherein the disease estimation step includes:

a plurality of estimation steps of outputting confidence score information that represents confidence score that the subject's eye is the glaucoma eye, using each of the learned models for each type of the images; and a classification step of outputting the estimation information from a plurality of confidence score information that are output from the plurality of estimation steps, using a classification model obtained by performing machine learning.

6. The ophthalmic information processing method of claim 5, further comprising a learning step of generating the learned models by performing supervised machine learning for each type of the images.

7. The ophthalmic information processing method of claim 5, further comprising an image generating step of generating at least one of the images based on three-dimensional OCT data of the subject's eye.

8. A computer readable non-transitory recording medium in which a program for causing a computer to execute each step of the ophthalmic information processing method is recorded, wherein the ophthalmic information processing method comprises:

an acquisition step of acquiring a plurality of images with different cross-sectional orientations from each other of a subject's eye, the images having image types including a B-scan image in a horizontal direction passing through a center of a optic disc or near the center, a B-scan image in a vertical direction passing through the center of the optic disc or near the center, a B-scan image in the vertical direction passing through a fovea or near the fovea, a projection image, and an en-face image; and a disease estimation step of outputting estimation information for estimating whether or not the subject's eye is a glaucoma eye from the images, using a plurality of learned models obtained by performing machine learning for each type of the images, wherein the disease estimation step includes:

a plurality of estimation steps of outputting confidence score information that represents confidence score that the subject's eye is the glaucoma eye, using each of the learned models for each type of the images; and a classification step of outputting the estimation information from a plurality of confidence score information that are output from the plurality of estimation steps, using a classification model obtained by performing machine learning.

* * * * *